(12) United States Patent
Pannuzzo et al.

(10) Patent No.: US 10,273,847 B2
(45) Date of Patent: Apr. 30, 2019

(54) SYSTEMS AND METHODS FOR CONTROLLING BYPASS OF EXHAUST AFTER TREATMENT DEVICE

(71) Applicant: GM GLOBAL TECHNOLOGY OPERATIONS LLC, Detroit, MI (US)

(72) Inventors: Andrea Pannuzzo, Turin (IT); Luca Gatti, Turin (IT)

(73) Assignee: GM GLOBAL TECHNOLOGY OPERATIONS LLC, Detroit, MI (US)

( * ) Notice: Subject to any disclaimer, the term of this patent is extended or adjusted under 35 U.S.C. 154(b) by 67 days.

(21) Appl. No.: 15/606,083

(22) Filed: May 26, 2017

(65) Prior Publication Data

US 2018/0340456 A1 Nov. 29, 2018

(51) Int. Cl.
*F01N 9/00* (2006.01)
*F01N 3/20* (2006.01)
*F01N 3/021* (2006.01)
*F01N 3/031* (2006.01)

(52) U.S. Cl.
CPC .......... *F01N 3/2053* (2013.01); *F01N 3/021* (2013.01); *F01N 3/031* (2013.01); *F01N 9/00* (2013.01); F01N 2410/00 (2013.01); F01N 2410/02 (2013.01); F01N 2560/06 (2013.01); F01N 2900/1404 (2013.01); F01N 2900/1602 (2013.01)

(58) Field of Classification Search
CPC ........ F01N 3/031; F01N 3/032; F01N 3/0878; F01N 3/2053; F01N 2410/02
See application file for complete search history.

(56) References Cited

U.S. PATENT DOCUMENTS

| 5,582,002 A * | 12/1996 | Pattas ..................... F01N 3/023 60/274 |
| 2008/0271439 A1* | 11/2008 | Londos ................. F01N 3/0814 60/288 |

FOREIGN PATENT DOCUMENTS

DE 3806219 A1 * 9/1989 ............. F01N 3/023

OTHER PUBLICATIONS

Machine translation of DE 3806219 A1, accessed Sep. 26, 2018.*

* cited by examiner

*Primary Examiner* — Jonathan Matthias
(74) *Attorney, Agent, or Firm* — Lorenz & Kopf, LLP (57) ABSTRACT

A method for controlling a valve for directing an exhaust gas stream through an exhaust duct having an after treatment device and a bypass duct in an exhaust system of a vehicle is provided. The method includes receiving first sensor signals from a first sensor coupled downstream from the exhaust after treatment device, and processing the first sensor signals to determine a first temperature of an outlet exhaust gas stream. The method includes determining a bypass command based on whether the first temperature exceeds a first pre-defined threshold for the outlet exhaust gas stream. The method also includes outputting a control signal based on the determining of the bypass command to a valve coupled to the bypass duct and the exhaust pipe upstream of the after treatment device to move the valve between a first state and a second state.

18 Claims, 8 Drawing Sheets

SYSTEMS AND METHODS FOR CONTROLLING BYPASS OF EXHAUST AFTER TREATMENT DEVICE

TECHNICAL FIELD

The present disclosure generally relates to vehicles, and more particularly relates to systems and methods for controlling a bypass of an exhaust after treatment device associated with the vehicle.

INTRODUCTION

Generally, vehicles, such as motor vehicles, are powered by a propulsion system. Certain motor vehicles employ a diesel engine as a propulsion system, which provides power that is transferred to a transmission, for example, and used to drive the motor vehicle. Due to the operating characteristics of a diesel engine, one or more exhaust after treatment devices may be employed to remove combustion byproducts, such as diesel particulate matter, carbon monoxide, nitrogen oxides, unburned hydrocarbons, and the like, from an exhaust stream prior to the exhaust stream exiting the vehicle. In an example of a diesel particulate filter as the exhaust after treatment device, the diesel particulate filter over time may become loaded with diesel particulate matter or other combustion byproducts such as hydrocarbons. In certain instances, it may be undesirable to direct exhaust gas to flow through the diesel particulate filter due to the amount of diesel particulate matter and/or hydrocarbons captured by the diesel particulate filter.

Accordingly, it is desirable to provide a system and method for controlling a bypass of an exhaust after treatment device associated with a vehicle, which directs the flow of exhaust gas, around, not through the exhaust after treatment device, such as a diesel particulate filter, and thereby reduces the likelihood of a thermal event. Furthermore, other desirable features and characteristics of the present disclosure will become apparent from the subsequent detailed description and the appended claims, taken in conjunction with the accompanying drawings and the foregoing technical field and background.

SUMMARY

In various embodiments, provided is a method for controlling a valve for directing an exhaust gas stream through an exhaust duct having an after treatment device and a bypass duct in an exhaust system of a vehicle. The method includes receiving, by a processor, first sensor signals from a first sensor coupled downstream from the exhaust after treatment device, and processing, by the processor, the first sensor signals to determine a first temperature of an outlet exhaust gas stream. The method includes determining, by the processor, a bypass command based on whether the first temperature exceeds a first pre-defined threshold for the outlet exhaust gas stream. The method also includes outputting, by the processor, a control signal based on the determining of the bypass command to a valve coupled to a bypass duct and an exhaust pipe upstream of the after treatment device to move the valve between a first state to establish fluid communication through the after treatment device and a second state to establish fluid communication through the bypass duct and around the after treatment device.

The outputting the control signal to the valve coupled to the bypass duct includes determining, by the processor, the bypass command based on the first temperature exceeding the first pre-defined threshold and the valve being in the first state, and outputting, by the processor, the control signal to move the valve to the second state. The method includes generating, by the processor, an occupant notification when the first temperature exceeds the first pre-defined threshold. The outputting the control signal to the valve coupled to the bypass duct includes determining, by the processor, the bypass command based on the first temperature exceeding the first pre-defined threshold for a period of time that exceeds a time period threshold and the valve being in the first state, and outputting, by the processor, the control signal to the valve to move to the second based on the bypass command. Subsequent to the outputting, by the processor, the control signal to the valve, the method includes receiving, by the processor, the first sensor signals from the first sensor, processing, by the processor, the first sensor signals to determine a current temperature of the outlet exhaust gas stream, determining, by the processor, an enable based on the current temperature being below the first pre-defined threshold and the valve being in the second state, and outputting, by the processor, the control signal to move the valve to the first state based on the enable. The method includes receiving, by the processor, second sensor signals from a second sensor coupled to the after treatment device, processing, by the processor, the second sensor signals to determine a second temperature of a through-flow exhaust gas stream and determining, by the processor, the bypass command based on whether the second temperature exceeds a second pre-defined threshold for the through-flow exhaust gas stream. The method includes determining, by the processor, the bypass command based on the second temperature exceeding the second pre-defined threshold and the valve being in the first state, and outputting, by the processor, the control signal to move the valve to the second state based on the bypass command. The method includes receiving, by the processor, third sensor signals from a third sensor coupled upstream from the exhaust after treatment device, processing, by the processor, the third sensor signals to determine a third temperature of an inlet exhaust gas stream, determining, by the processor, the bypass command based on whether the third temperature exceeds a third pre-defined threshold for the inlet exhaust gas stream, and outputting, by the processor, the control signal to move the valve to the second state based on the bypass command. The method further includes determining, by the processor, the bypass command based on the third temperature exceeding the third pre-defined threshold and the valve being in the first state, and outputting, by the processor, the bypass command to move the valve to the second state based on the bypass command.

In various embodiments, also provided is a control apparatus for an exhaust system having an after treatment device in an exhaust pipe of a vehicle. The control apparatus includes a first sensor located in the exhaust pipe downstream of the after treatment device. The first sensor is configured to observe a first temperature of an outlet exhaust gas stream and to generate first sensor signals based on the first temperature. The control apparatus includes a bypass duct coupled to the exhaust pipe upstream of the exhaust after treatment device and downstream from the exhaust after treatment device. The control apparatus includes a valve coupled to the bypass duct and the exhaust pipe upstream of the after treatment device. The valve is configured to move between a first state to establish fluid communication through the after treatment device and a second state to establish fluid communication through the bypass duct and around the after treatment device. The control apparatus includes a controller, having a processor, configured to: receive first sensor signals from the first sensor; determine a first temperature of an outlet exhaust gas stream based on the first sensor signals; determine a bypass command based on whether the first temperature exceeds a first pre-defined threshold for the outlet exhaust gas stream; and output a control signal based on the bypass command to move the valve between the first state and the second state.

The controller is also configured to: determine the bypass command based on the first temperature exceeding the first pre-defined threshold and the valve being in the first state; and output the control signal to move the valve to the second state. The controller is further configured to generate an occupant notification when the first temperature exceeds the first pre-defined threshold. The control apparatus further includes a second sensor located in the after treatment device and configured to observe a second temperature of a flow-through exhaust gas stream and generate second sensor signals based on the second temperature. The controller is further configured to process the second sensor signals to determine the second temperature of the through-flow exhaust gas stream, and to determine the bypass command based on whether the second temperature exceeds a second pre-defined threshold for the through-flow exhaust gas stream. The controller is further configured to determine the bypass command based on the second temperature exceeding the second pre-defined threshold and the valve being in the first state, and output the control signal to move the valve to the second state based on the bypass command. The control apparatus further includes a third sensor located in the exhaust pipe upstream from the after treatment device and configured to observe a third temperature of an inlet exhaust gas stream and generate third sensor signals based on the third temperature. The controller is further configured to determine the bypass command based on whether the third temperature exceeds a third pre-defined threshold for the inlet exhaust gas stream and to output the control signal to move the valve to the second state based on the bypass command. The controller is further configured to determine the bypass command based on the third temperature exceeding the third pre-defined threshold and the valve being in the first state and to output the bypass command to move the valve to the second state based on the bypass command.

Also provided according to various embodiments is a vehicle. The vehicle includes an exhaust system having an after treatment device in an exhaust pipe. The vehicle includes a bypass duct coupled to the exhaust pipe upstream of the exhaust after treatment device and downstream from the exhaust after treatment device. The vehicle includes a valve coupled to the bypass duct and the exhaust pipe upstream of the after treatment device and configured to move between a first state to establish fluid communication through the after treatment device and a second state to establish fluid communication through the bypass duct and around the after treatment device. The vehicle includes a first sensor located in the exhaust pipe downstream of the after treatment device and configured to observe a first temperature of an exhaust gas stream and generate first sensor signals based on the first temperature. The vehicle includes a second sensor located in the exhaust pipe upstream of the first sensor and configured to observe a second temperature of the exhaust gas stream and generate second sensor signals based on the second temperature. The vehicle includes a controller, having a processor, configured to: receive first sensor signals from the first sensor and second sensor signals from the second sensor; determine a first temperature of the exhaust gas stream based on the first sensor signals and a second temperature of the exhaust gas stream based on the second sensor signals; determine a bypass command based on whether the first temperature exceeds a first pre-defined threshold or the second temperature exceeds a second pre-defined threshold; and output a control signal based on the bypass command to move the valve between the first state and the second state.

The vehicle includes a notification device, wherein the controller is further configured to communicate an occupant notification to the notification device when the first temperature exceeds the first pre-defined threshold or the second temperature exceeds the second pre-defined threshold. The notification device includes at least an indicator light and a warning user interface rendered on a display associated with the vehicle. The controller is further configured to determine whether the second temperature exceeds the second pre-defined threshold when the first temperature is below the first pre-defined threshold.

BRIEF DESCRIPTION OF THE DRAWINGS

The exemplary embodiments will hereinafter be described in conjunction with the following drawing figures, wherein like numerals denote like elements, and wherein.

DETAILED DESCRIPTION

The following detailed description is merely exemplary in nature and is not intended to limit the application and uses. Furthermore, there is no intention to be bound by any expressed or implied theory presented in the preceding technical field, background, brief summary or the following detailed description. As used herein, the term module refers to any hardware, software, firmware, electronic control component, processing logic, and/or processor device, individually or in any combination, including without limitation: application specific integrated circuit (ASIC), an electronic circuit, a processor (shared, dedicated, or group) and memory that executes one or more software or firmware programs, a combinational logic circuit, and/or other suitable components that provide the described functionality.

Embodiments of the present disclosure may be described herein in terms of schematic, functional and/or logical block components and various processing steps. It should be appreciated that such block components may be realized by any number of hardware, software, and/or firmware components configured to perform the specified functions. For example, an embodiment of the present disclosure may employ various integrated circuit components, e.g., memory elements, digital signal processing elements, logic elements, look-up tables, or the like, which may carry out a variety of functions under the control of one or more microprocessors or other control devices. In addition, those skilled in the art will appreciate that embodiments of the present disclosure may be practiced in conjunction with any number of systems, and that the vehicle systems described herein is merely exemplary embodiments of the present disclosure.

For the sake of brevity, conventional techniques related to signal processing, data transmission, signaling, control, and other functional aspects of the systems (and the individual operating components of the systems) may not be described in detail herein. Furthermore, the connecting lines shown in the various figures contained herein are intended to represent example functional relationships and/or physical couplings between the various elements. It should be noted that many alternative or additional functional relationships or physical connections may be present in an embodiment of the present disclosure.

Figure 1:
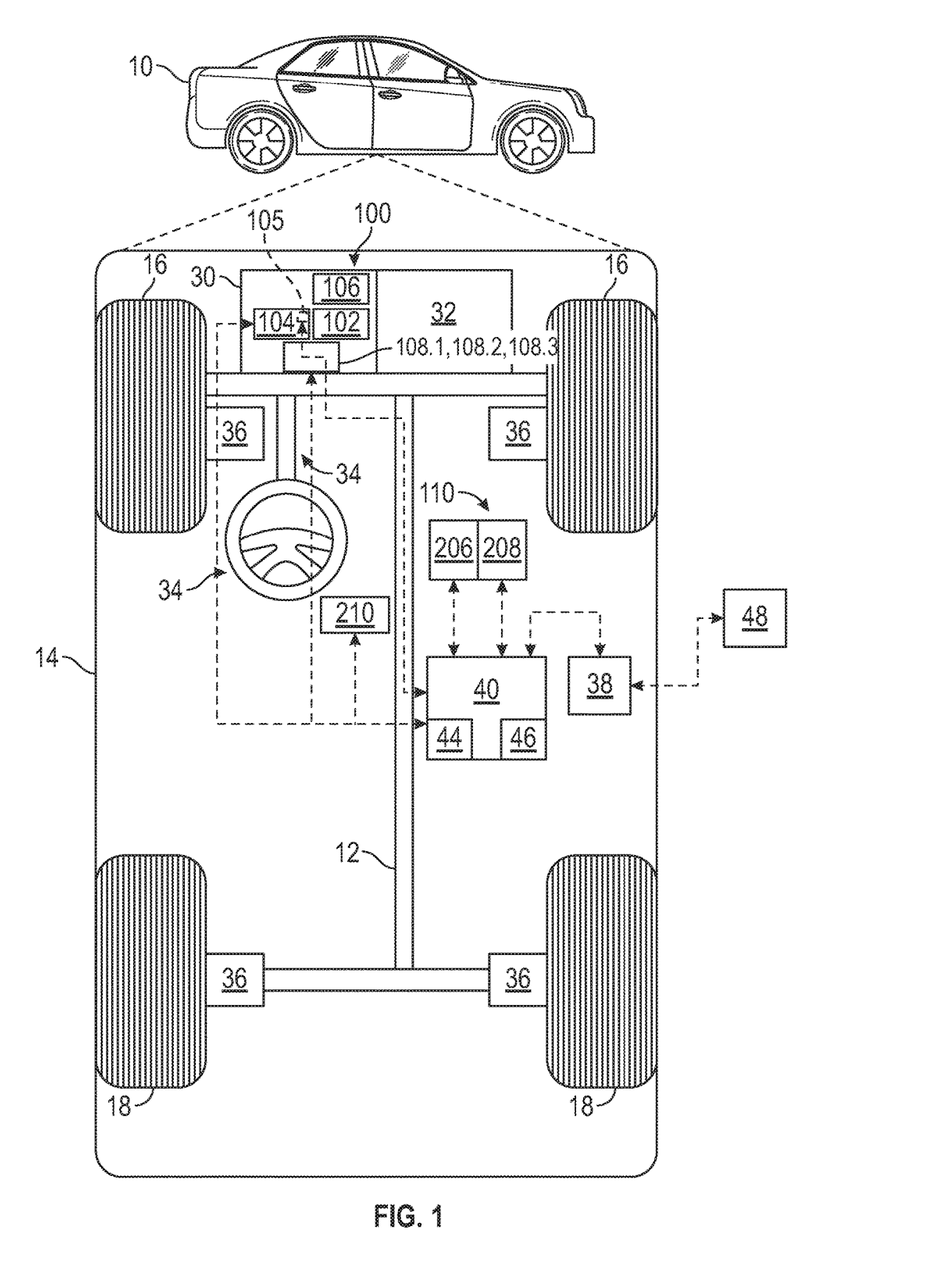
FIG. 1 is a functional block diagram illustrating a vehicle having an after treatment bypass system, in accordance with various embodiments.

With reference to FIG. 1, an after treatment bypass system shown generally at 100 is associated with a vehicle 10 in accordance with various embodiments. In general, the after treatment bypass system 100 includes an exhaust after treatment system 102, a valve 104, a bypass duct 106, one or more sensing devices or sensors 108.1-108.3 or collectively 108 and a human-machine interface 110. As will be discussed, the valve 104 is controlled to direct exhaust gas into the bypass duct 106 to bypass the exhaust after treatment system 102 based on sensor signals from the one or more sensors 108. The after treatment bypass system 100 also outputs one or more alerts to an operator of the vehicle 10 via the human-machine interface 110 based on the sensor signals from the one or more sensors 108. As a result of bypassing the exhaust after treatment system 102, the after treatment bypass system 100 directs the flow of exhaust gas including any oxygen contained therein around, not through, the exhaust after treatment system 102 for reducing the likelihood of a thermal event associated with the exhaust after treatment system 102, which might cause sintering or substrate melting of the after treatment device. Although the figures shown herein depict an example with certain arrangements of elements, additional intervening elements, devices, features, or components may be present in an actual embodiment. It should also be understood that FIG. 1 is merely illustrative and may not be drawn to scale.

As depicted in FIG. 1, the vehicle 10 generally includes a chassis 12, a body 14, front wheels 16, and rear wheels 18. The vehicle 10 is depicted in the illustrated embodiment as a passenger car, but it should be appreciated that any other vehicle including trucks, sport utility vehicles (SUVs), recreational vehicles (RVs), marine vessels, aircraft, etc., can also be used. As shown, the vehicle 10 generally includes a propulsion system 30, a transmission system 32, a steering system 34, a brake system 36, a communication system 38, a controller 40 and the after treatment bypass system 100.

The propulsion system 30 may, in various embodiments, include an internal combustion engine, such as a diesel engine, and portions of the after treatment bypass system 100, as will be discussed with regard to FIG. 2.

The controller 40 includes at least one processor 44 and a computer readable storage device or media 46. The processor 44 can be any custom made or commercially available processor, a central processing unit (CPU), a graphics processing unit (GPU), an auxiliary processor among several processors associated with the controller 40, a semiconductor based microprocessor (in the form of a microchip or chip set), a macroprocessor, any combination thereof, or generally any device for executing instructions. The computer readable storage device or media 46 may include volatile and nonvolatile storage in read-only memory (ROM), random-access memory (RAM), and keep-alive memory (KAM), for example. KAM is a persistent or non-volatile memory that may be used to store various operating variables while the processor 44 is powered down. The computer-readable storage device or media 46 may be implemented using any of a number of known memory devices such as PROMs (programmable read-only memory), EPROMs (electrically PROM), EEPROMs (electrically erasable PROM), flash memory, or any other electric, magnetic, optical, or combination memory devices capable of storing data, some of which represent executable instructions, used by the controller 40 in controlling components associated with the vehicle 10.

The instructions may include one or more separate programs, each of which comprises an ordered listing of executable instructions for implementing logical functions. The instructions, when executed by the processor 44, receive and process signals, perform logic, calculations, methods and/or algorithms for controlling the components of the vehicle 10, and generate control signals to control the components of the vehicle 10 based on the logic, calculations, methods, and/or algorithms. Although only one controller 40 is shown in FIG. 1, embodiments of the vehicle 10 may include any number of controllers 40 that communicate over any suitable communication medium or a combination of communication mediums and that cooperate to process the sensor signals, perform logic, calculations, methods, and/or algorithms, and generate control signals to control features of the vehicle 10.

In various embodiments, one or more instructions of the controller 40 are associated with the after treatment bypass system 100 and, when executed by the processor 44, the instructions receive and process signals from the one or more sensors 108 to determine various conditions associated with the operation of the exhaust after treatment system 102. For example, as will be discussed herein, the instructions of the controller 40, when executed by the processor 44, receive and process sensor signals from a position sensor 105 associated with the valve 104 and determine whether the valve 104 is in a first state (in which exhaust gas flows through an after treatment device) or a second state (in which exhaust gas flows through the bypass duct 106). The instructions of the controller 40, when executed by the processor 44, receive and process the sensor signals from the one or more sensors 108 and determine whether the temperature associated with the exhaust after treatment system 102 is above or exceeds (i.e., is greater than) a pre-defined threshold. The instructions of the controller 40, when executed by the processor 44, output control signals to the valve 104 to move the valve 104 from the first state to the second state based on the determination that the temperature associated with the exhaust after treatment system 102 exceeds the pre-defined threshold for a pre-defined period of time and the determination that the valve 104 is in the first state. In various embodiments, the instructions of the controller 40, when executed by the processor 44, also output one or more notifications to the human-machine interface 110 based on the determination that the temperature associated with the exhaust after treatment system 102 exceeds the pre-defined threshold for the pre-defined period of time. The instructions of the controller 40, when executed by the processor 44, also generate and output control signals to the valve 104 to move the valve 104 to the first state based on the determination that the temperature has returned below the pre-defined threshold for the pre-defined period of time and the determination that the valve 104 is in the second state.

Figure 2:
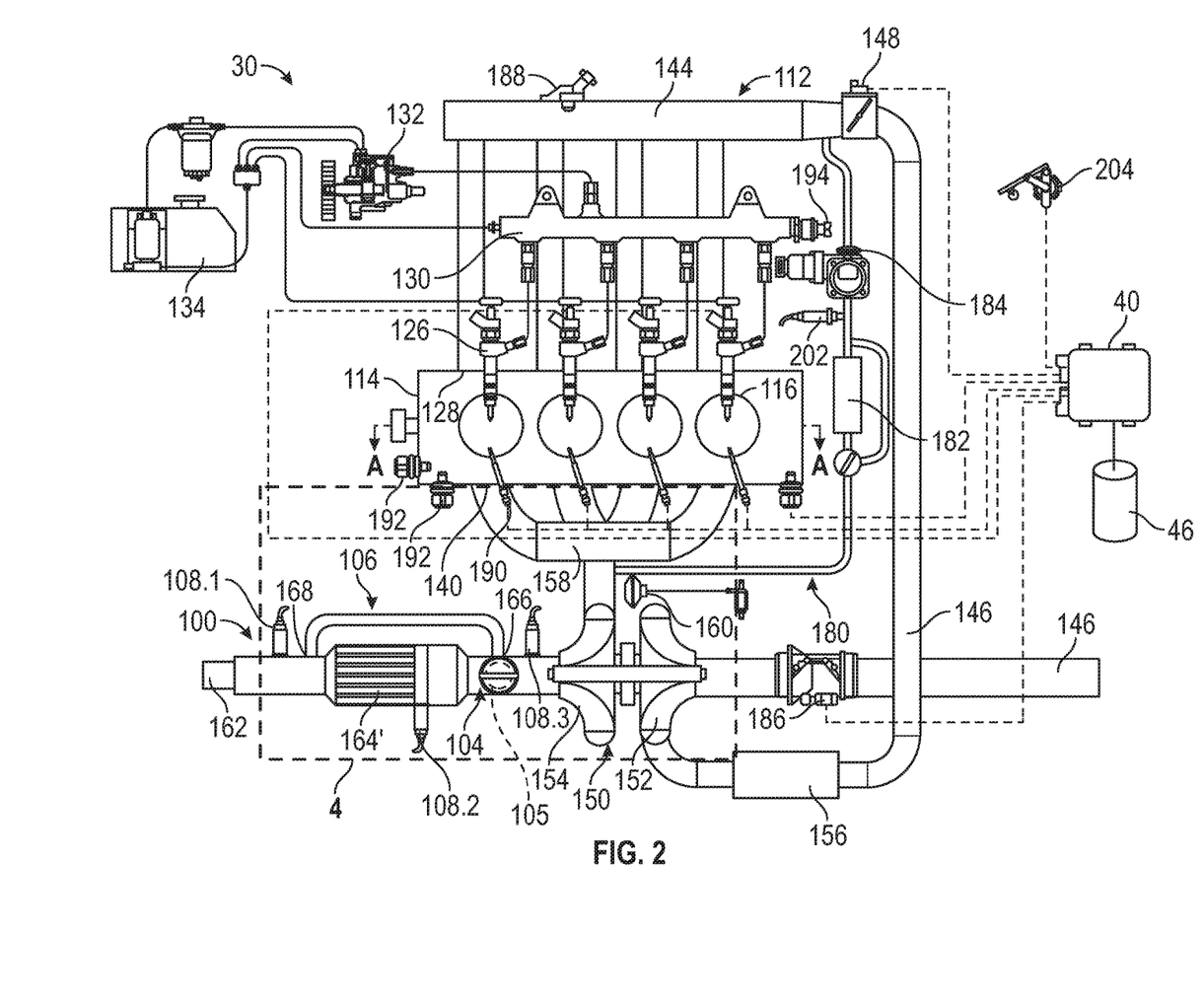
FIG. 2 schematically illustrates a propulsion system for the vehicle of FIG. 1 which includes a portion of the after treatment bypass system, in accordance with various embodiments.
Figure 3:
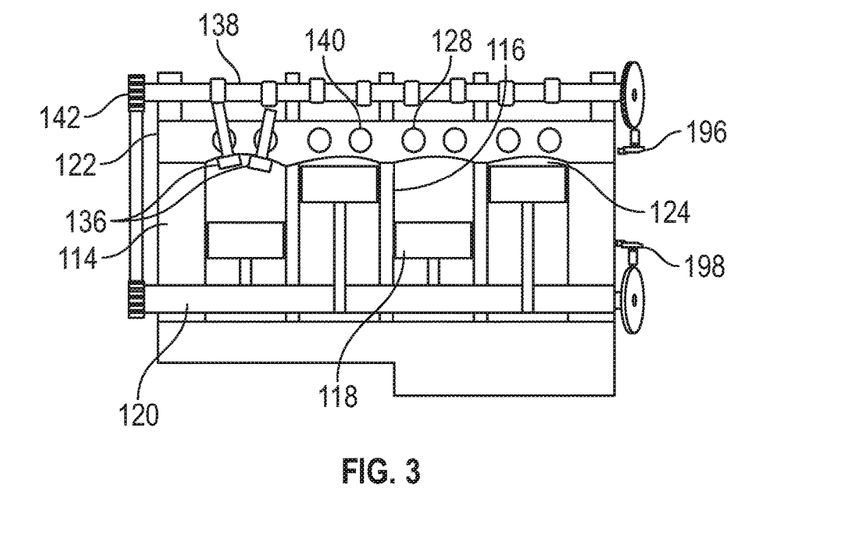
FIG. 3 is a cross-section taken along line A-A of FIG. 2, which illustrates the internal combustion engine of the propulsion system of FIG. 2, in accordance with various embodiments.

With reference to FIGS. 2 and 3, the propulsion system 30 is shown in greater detail. In one example, the propulsion system 30 is an internal combustion engine 112, such as a diesel engine, having an engine block 114 defining at least one cylinder 116 having a piston 118 coupled to rotate a crankshaft 120. A cylinder head 122 cooperates with the piston 118 to define a combustion chamber 124. A fuel and air mixture is injected into the combustion chamber 124 and ignited, resulting in hot expanding exhaust gasses causing reciprocal movement of the piston 118. The fuel is provided by at least one fuel injector 126 and the air through at least one intake port 128. The fuel is provided at high pressure to the fuel injector 126 from a fuel rail 130 in fluid communication with a high pressure fuel pump 132 that increase the pressure of the fuel received from a fuel source 134. Each of the cylinders 116 has at least two valves 136, actuated by a camshaft 138 rotating in time with the crankshaft 120. The valves 136 selectively allow air into the combustion chamber 124 from the port 128 and alternately allow exhaust gases to exit through an exhaust port 140. In some examples, a cam phaser 142 may selectively vary the timing between the camshaft 138 and the crankshaft 120.

The air may be distributed to the air intake port(s) 128 through an intake manifold 144. An air intake duct 146 may provide air from the ambient environment to the intake manifold 144. In other embodiments, a throttle body 148 may be provided to regulate the flow of air into the intake manifold 144. In still other embodiments, a forced air system such as a turbocharger 150, having a compressor 152 rotationally coupled to a turbine 154, may be provided. Rotation of the compressor 152 increases the pressure and temperature of the air in the air intake duct 146 and intake manifold 144. An intercooler 156 disposed in the air intake duct 146 may reduce the temperature of the air. The turbine 154 rotates by receiving exhaust gases from an exhaust manifold 158 that directs exhaust gases from the exhaust ports 140 and through a series of vanes prior to expansion through the turbine 154. The exhaust gases exit the turbine 154 and are directed into the exhaust after treatment system 102 or the bypass duct 106 of the after treatment bypass system 100 based on the state of the valve 104. This example shows a variable geometry turbine (VGT) with a VGT actuator 160 arranged to move the vanes to alter the flow of the exhaust gases through the turbine 154. In other embodiments, the turbocharger 150 may be fixed geometry and/or include a waste gate.

Figure 4:
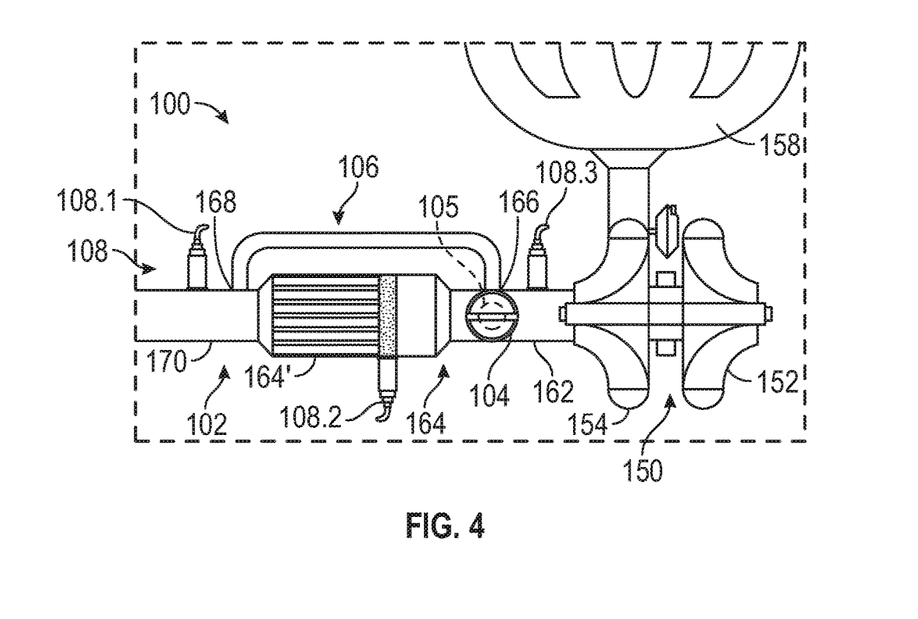
FIG. 4 is a detail view of the propulsion system of FIG. 2, taken at 4 in FIG. 2, which illustrates the portion of the after treatment bypass system.

With reference to FIG. 4, the after treatment bypass system 100 is shown in greater detail. The exhaust after treatment system 102 includes an exhaust pipe 162 having one or more exhaust after treatment devices 164. The after treatment devices 164 may be any device configured to change the composition of the exhaust gases. Some examples of after treatment devices 164 include, but are not limited to, catalytic converters (two and three way), oxidation catalysts, lean NOx traps, hydrocarbon adsorbers, selective catalytic reduction (SCR) systems, particulate filters, Selective Catalytic Reduction on Filter (SCRF), gasoline particulate filter (GPF) and/or a diesel particulate filter (DPF) 164'. It should be noted that while the exhaust after treatment system 102 is illustrated herein as including a single after treatment device 164, such as the DPF 164', the exhaust after treatment system 102 may include multiple exhaust after treatment devices 164 and/or may include a single different type of after treatment device 164.

Figure 5:
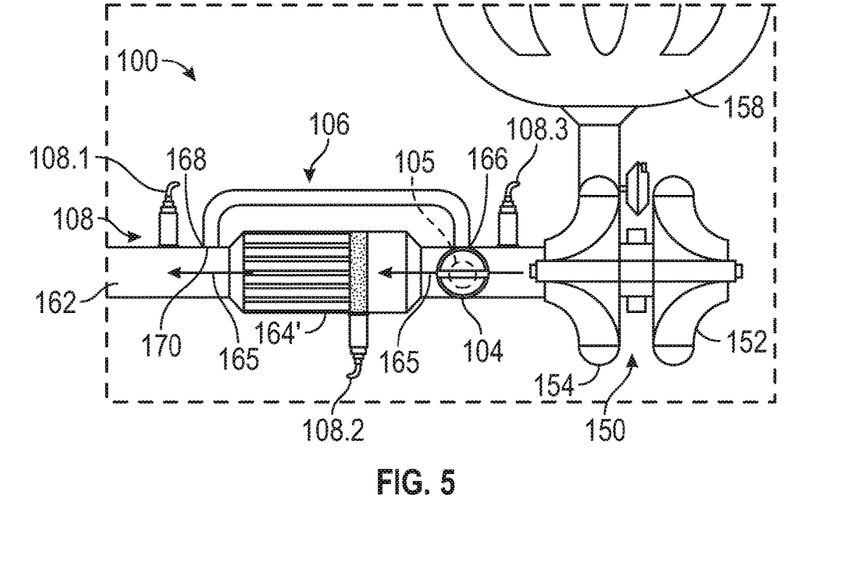
FIG. 5 is a detail view similar to FIG. 4 in which a valve of the after treatment bypass system is in a first state.
Figure 6:
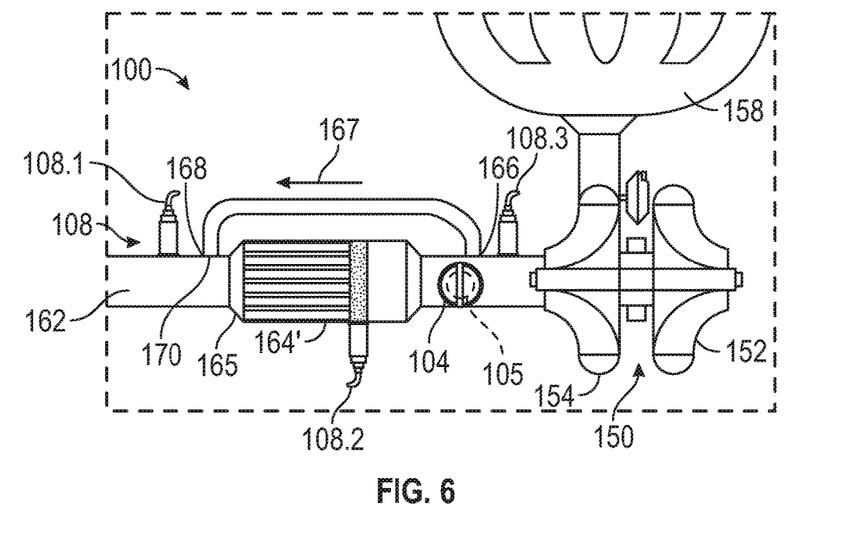
FIG. 6 is a detail view similar to FIG. 4 in which a valve of the after treatment bypass system is in a second state.

The valve 104 is coupled to or disposed in the exhaust pipe 162 so as to be upstream from the DPF 164'. Generally, the valve 104 is coupled to the exhaust pipe 162 and is coupled to the bypass duct 106. In one example, the valve 104 is an electronically actuated two way directional valve, which is controlled by the controller 40 to enable the exhaust gas to flow either through the DPF 164' or through the bypass duct 106. The valve 104 is in communication with the controller 40 over a suitable communication medium or bus that facilitates the transfer of power, commands, etc. The valve 104 is responsive to one or more control signals from the controller 40 to move between the first state (FIG. 5) in which exhaust gas flows through the DPF 164' as indicated by arrow 165; and the second state (FIG. 6) in which exhaust gas flows through the bypass duct 106 and thus is directed around the DPF 164' as indicated by arrow 167. For example, the valve 104 may include a body or flap that is controlled by an actuator in communication with the controller 40 and responsive to the one or more control signals to move the body or flap, and thus, the valve 104, between the first state (FIG. 5) and the second state (FIG. 6). Thus, the valve 104 may also comprise a two-way diverter flap valve. By routing the flow of the exhaust gas through the bypass duct 106 and around the DPF 164', the oxygen present in the DPF 164' decreases, which substantially reduces the likelihood of a thermal event in the DPF 164'.

The state of the valve 104 (i.e. in the first state or the second state) may be stored in the media 46 associated with the controller 40 or may be monitored by the position sensor 105. In one example, the position sensor 105 observes the state of the valve 104 (i.e. in the first state or the second state) and generates sensor signals based thereon. In one example, the position sensor 105 is coupled to the actuator and observes a movement of the actuator and generates sensor signals based thereon. For example, the position sensor 105 may include, but is not limited to, a rotary encoder, a Hall effect sensor, etc. Alternatively, the position sensor 105 may be coupled to the body or flap for observing a movement of the body or flap and generating sensor signals based thereon.

The bypass duct 106 has a first end 166 and a second end 168. The first end 166 is coupled to the valve 104 to receive the exhaust gas during a bypass of the DPF 164'. In one example, the first end 166 is fixedly coupled to the valve 104 via mechanical fasteners, welding, etc. The second end 168 is coupled to the exhaust pipe 162 downstream from the DPF 164'. In one example, the exhaust pipe 162 includes a bore 170, and the second end 168 is coupled about the bore 170 via welding, mechanical fasteners, etc., to direct the bypass exhaust gas into the exhaust pipe 162 downstream from and around the DPF 164'. Thus, the bypass duct 106 is coupled to the exhaust pipe 162 upstream of the exhaust after treatment device or DPF 164' and downstream from the exhaust after treatment device or DPF 164' to direct the flow of exhaust gas around the exhaust after treatment device or DPF 164'.

In various embodiments, the sensors 108 may include a first sensor 108.1, a second sensor 108.2 and a third sensor 108.3. The first sensor 108.1 is coupled to the exhaust pipe 162 downstream from the second end 168 of the bypass duct 106 and downstream from the DPF 164' so as to observe the exhaust gas stream that flows from the after treatment device through the exhaust pipe 162 or in other words the outlet exhaust gas stream. The second sensor 108.2 is downstream from the valve 104, and in one example, is coupled to or disposed within the DPF 164' so as to observe the exhaust gas stream that flows through the DPF 164' or in other words the through-flow exhaust gas stream. The third sensor 108.3 is coupled to the exhaust pipe 162 downstream from the turbine 154, upstream from the valve 104, upstream from the first end 166 of the bypass duct 106 and upstream from the DPF 164' so as to observe the exhaust gas stream exiting the turbine 154 before flowing into the after treatment device 164, or in other words the inlet exhaust gas stream. It should be noted that the third sensor 108.3 may be optional. Each of the sensors 108 observe a temperature associated with the exhaust gas stream and generate sensor signals based thereon. Each of the sensors 108 are substantially the same, and in this example, each of the sensors 108 are thermocouples or other temperature sensors capable of observing a temperature of a fluid and generating sensor signals based thereon. The sensors 108 are each in communication with the controller 40 (FIG. 1) over a communication medium or bus that facilitates the transfer of data, power, etc.

In certain embodiments, a fourth sensor 108 may be coupled to the DPF 164'. In this example, the fourth sensor 108 may observe a condition of the DPF 164', such as a temperature of the DPF 164', and generate sensor signals based thereon. The fourth sensor 108 is in communication with the controller 40, and the controller 40 may process the received sensor signals to determine (based on the observed temperature) whether the exhaust gas is flowing through the bypass duct 106 (i.e. low temperature observed) or whether the exhaust gas is flowing through the DPF 164'' (i.e. high temperature observed), which may be used by the controller 40 (via comparison to one or more thresholds) to determine the state of the valve 104. Alternatively, sensor signals from the second sensor 108.2 may be used (via comparison to one or more thresholds) to determine the state of the valve 104.

With reference back to FIG. 2, the propulsion system 30 may include in various embodiments a high pressure exhaust gas recirculation (EGR) system 180 coupled between the exhaust manifold 158 and the intake manifold 144. The EGR system 180 may include an EGR cooler 182 to reduce the temperature of the exhaust gases in the EGR system 180. An EGR valve 184 regulates a flow of exhaust gases in the EGR system 180.

The propulsion system 30 may also include one or more sensors and/or devices associated with the ICE 112, which are in communication with the controller 40 over a communication medium that facilitates the transfer of power, data, commands, etc. The controller 40 may receive input signals from various sensors configured to generate the signals in proportion to various physical parameters associated with the ICE 112. The sensors include, but are not limited to, a mass airflow and temperature sensor 186, a manifold pressure and temperature sensor 188, a combustion pressure sensor 190, coolant and oil temperature and level sensors 192, a fuel rail pressure sensor 194, a cam position sensor 196, a crank position sensor 198, exhaust pressure sensors 200, an EGR temperature sensor 202, and an accelerator pedal position sensor 204. Furthermore, the controller 40 may generate output signals to various control devices that are arranged to control the operation of the ICE 112, including, but not limited to, the fuel injectors 126, the throttle body 148, the EGR Valve 184, the VGT actuator 160, and the cam phaser 142. Note, dashed lines are used to indicate communication between the controller 40 and the various sensors and devices, but some are omitted for clarity.

With reference back to FIG. 1, the human-machine interface 110 is in communication with the controller 40 via a communication medium or bus that facilitates the transfer of power, data, commands, etc. The human-machine interface 110 may be configured in a variety of ways. In some embodiments, the human-machine interface 110 may include a touchscreen interface 206 that may be overlaid on a display 208, various switches or levers, one or more buttons, a keyboard, an audible device, a microphone associated with a speech recognition system, or various other human-machine interface devices. In one example, the human-machine interface 110 also includes an indicator light 210. The indicator light 210 may be disposed in an instrument panel associated with the vehicle 10, or may be disposed at any location that is visible by an occupant of the vehicle 10. The indicator light 210 is responsive to one or more control signals from the controller 40 to illuminate, thereby notifying the occupant of a condition of the vehicle 10. In one example, the indicator light 210 is a light emitting diode (LED), however, the indicator light 210 may comprise any illumination device or source responsive to one or more control signals from the controller 40, including, but not limited to, an organic light emitting diode (OLED), etc. The indicator light 210 may also be disposed behind one or more words or symbols, to illuminate the one or more words or symbols to visually indicate to the occupant a condition of the vehicle 10. In this example, the indicator light 210 may illuminate a symbol of an engine and/or may illuminate text that reads "Check Engine" or "Service Engine."

The display 208 comprises any suitable technology for displaying information, including, but not limited to, a liquid crystal display (LCD), organic light emitting diode (OLED), plasma, or a cathode ray tube (CRT). In this example, the display 208 is an electronic display capable of graphically displaying one or more user interfaces under the control of the controller 40. Those skilled in the art may realize other techniques to implement the display 208 in the vehicle 10.

It should be noted that the human-machine interface 110 is not limited to the display 208 and/or the indicator light 210 as notification devices that communicate an occupant notification of a condition of the vehicle 10. In this regard, the human-machine interface 110 may also include one or more haptic devices that are responsive to one or more control signals from the controller 40 to provide haptic feedback to the occupant of a condition of the vehicle 10, one or more audible devices that are responsive to one or more control signals from the controller 40 to provide a warning message or audio feedback to the occupant of a condition of the vehicle 10, etc. In addition, the vehicle 10 may output a notification to the other entities 48 to notify of the condition of the vehicle 10 via the communication system 38, for example.

As discussed above, the after treatment bypass system 100 receives sensor signals from the one or more sensors 108, and determines whether an observed temperature exceeds a predefined threshold. The after treatment bypass system 100 receives sensor signals from the position sensor 105, and determines a current position of the valve 104. The after treatment bypass system 100 generates and outputs one or more control signals for the valve 104 to move the valve 104 based on these determinations. In one example, the after treatment bypass system 100 generates and outputs the one or more control signals for the valve 104 to move the valve 104 from the first state to the second state based on the determination that the temperature exceeds the pre-defined threshold for a period of time and the determination that the valve 104 is in the first state. In a further example, the after treatment bypass system 100 generates and outputs the one or more control signals for the valve 104 to move the valve 104 from the second state to the first state based on the determination that the temperature has returned below the pre-defined threshold for a period of time and the determination that the valve 104 is in the second state. The after treatment bypass system 100 also generates and outputs one or more notifications for the occupant of the vehicle 10 based on the determination that the temperature exceeds the pre-defined threshold for a period of time.

Figure 7:
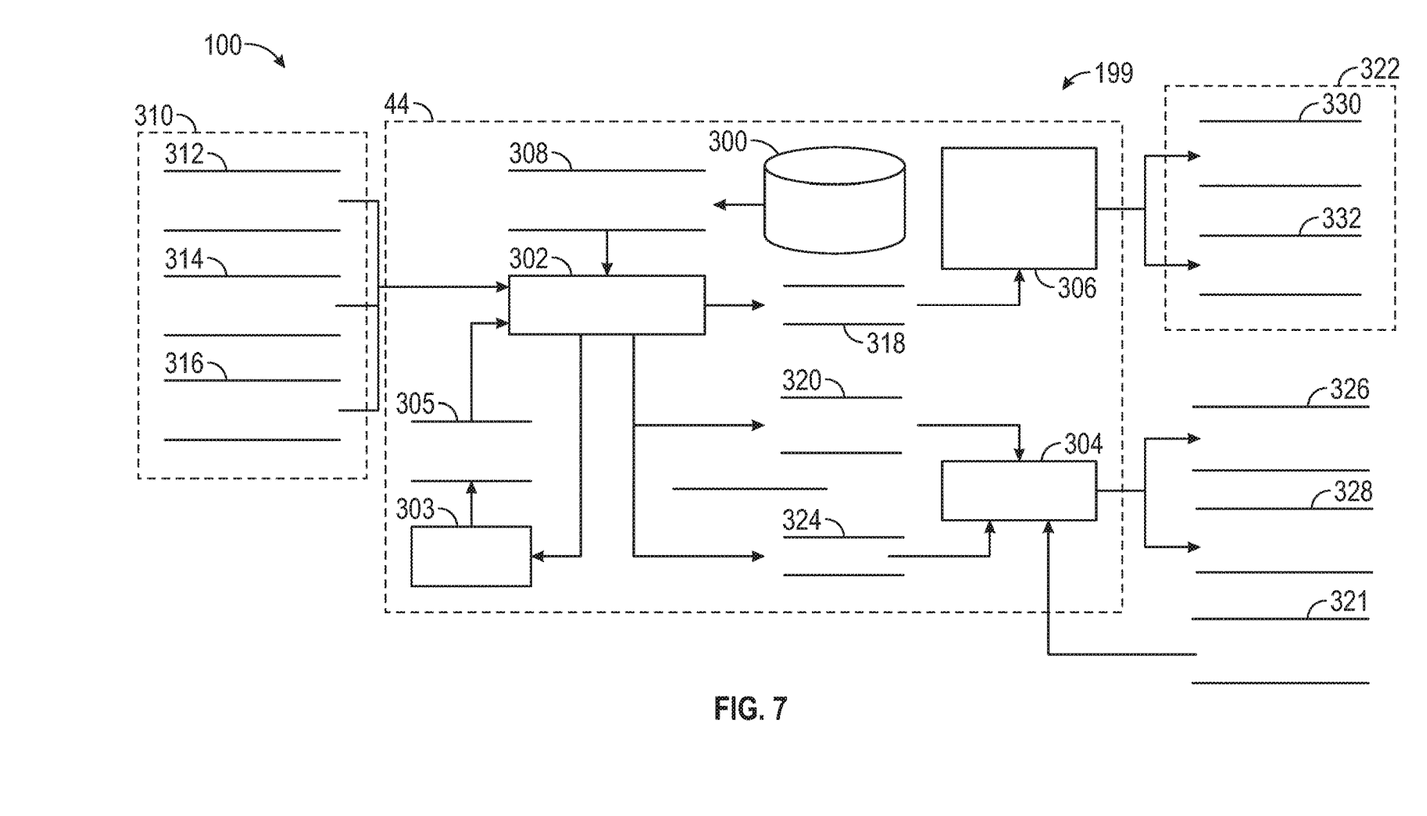
FIG. 7 is a dataflow diagram illustrating a control system of the after treatment bypass system of the vehicle of FIG. 1, in accordance with various embodiments.

For example, as shown in more detail with regard to FIG. 7 and with continued reference to FIGS. 1-6, a dataflow diagram illustrates various embodiments of a control system 199 of the after treatment bypass system 100 for the vehicle 10, which may be embedded within the controller 40. Various embodiments of the after treatment bypass system 100 according to the present disclosure can include any number of sub-modules embedded within the controller 40. As can be appreciated, the sub-modules shown in FIG. 7 can be combined and/or further partitioned to similarly control the valve 104, the indicator light 210 and to output one or more notifications to the display 208. Inputs to the after treatment bypass system 100 may be received from the sensors 108 (FIGS. 1 and 4-6), received from the position sensor 105 (FIGS. 1 and 4-6), received from other control modules associated with the vehicle 10, and/or determined/modeled by other sub-modules within the controller 40. In various embodiments, the after treatment bypass system 100 includes a threshold datastore 300, a temperature monitor module 302, a timer module 303, a valve control module 304 and a user interface (UI) control module 306.

The threshold datastore 300 stores data that indicates a threshold for a temperature observed by the sensors 108 and a threshold for a period of time. Thus, the threshold datastore 300 stores one or more threshold data values 308, which provide a first pre-defined threshold for a temperature of the exhaust gas stream observed by the first sensor 108.1; a second pre-defined threshold for a temperature of the exhaust gas stream observed by the second sensor 108.2; and a pre-defined threshold for a period of time. In various embodiments, the threshold datastore 300 also stores a third pre-defined threshold for a temperature of the exhaust gas stream observed by the third sensor 108.3. In one example, the first pre-defined threshold for the temperature observed by the first sensor 108.1 is about 850 degrees Celsius; the second pre-defined threshold for the temperature observed by the second sensor 108.2 is about 750 degrees Celsius; and the third pre-defined threshold for the temperature observed by the third sensor 108.3 is about 750 degrees Celsius. It should be understood that these threshold values for the temperatures observed by the sensors 108 are merely exemplary, as the temperature thresholds for each of the sensors 108 may vary based on the configuration of the DPF 164' and a temperature limit for one or more components surrounding the DPF 164'. The pre-defined threshold for the period of time T, in one example, is about 10 seconds. Each of the thresholds are pre-defined values based on a default or predetermined value (e.g., factory set).

The temperature monitor module 302 receives time data 305 from the timer module 303 and receives as input sensor data 310. In one example, the sensor data 310 includes first sensor data 312, second sensor data 314 and third sensor data 316. The first sensor data 312 is the sensor signals received from the first sensor 108.1. The second sensor data 314 is the sensor signals received from the second sensor 108.2. The third sensor data 316 is the sensor signals received from the third sensor 108.3. The temperature monitor module 302 processes the sensor signals received as the sensor data 310 and determines a temperature of the outlet exhaust gas stream observed by the first sensor 108.1, the flow-through exhaust gas stream observed by the second sensor 108.2 and the inlet exhaust gas stream observed by the third sensor 108.3.

The temperature monitor module 302 queries the threshold datastore 300 and retrieves the threshold data values 308 associated with temperatures observed by each of the sensors 108 along with the threshold for the period of time T. The temperature monitor module 302 compares the temperature observed by the first sensor 108.1 to the threshold data value 308 for the temperature observed by the first sensor 108.1. If the temperature observed by the first sensor 108.1 exceeds the threshold, the temperature monitor module 302 determines whether the temperature observed by the first sensor 108.1 exceeds the threshold data value 308 for the temperature observed by the first sensor 108.1 for a period of time (based on the time data 305) that exceeds the threshold period of time T. If the temperature observed by the first sensor 108.1 remains above the threshold data value 308 for the temperature observed by the first sensor 108.1 for the period of time that exceeds the threshold period of time T, the temperature monitor module 302 sets condition 318 for the UI control module 306 and sets a bypass command 320 for the valve control module 304.

Thus, the temperature monitor module 302 determines whether the temperature observed by the first sensor 108.1 exceeds (i.e., is greater than) the threshold data value 308 for the temperature observed by the first sensor 108.1 over the period of time that exceeds (i.e., is greater than) the threshold period of time T, and sets the condition 318 and the bypass command 320 based on this determination. As will be discussed, the condition 318 is an instruction for the UI control module 306 to output one or more notifications 322 to the occupant of the vehicle 10 based on the observed temperature. The bypass command 320 is an instruction for the valve control module 304 to change the valve 104 to the second state to bypass the DPF 164'.

If the temperature observed by the first sensor 108.1 is below (i.e., not greater than or less than or equal to) the threshold data value 308 for the temperature observed by the first sensor 108.1, the temperature monitor module 302 compares the temperature observed by the second sensor 108.2 to the threshold data value 308 for the temperature observed by the second sensor 108.2. If the temperature observed by the second sensor 108.2 exceeds (i.e., is greater than) the threshold, the temperature monitor module 302 determines whether the temperature observed by the second sensor 108.2 exceeds the threshold data value 308 for the temperature observed by the second sensor 108.2 for a period of time (based on the time data 305) that exceeds (i.e., is greater than) the threshold period of time T. If the temperature observed by the second sensor 108.2 remains above the threshold data value 308 for the temperature observed by the second sensor 108.2 for the period of time that exceeds the threshold period of time T, the temperature monitor module 302 sets the condition 318 for the UI control module 306 and sets the bypass command 320 for the valve control module 304. Thus, the temperature monitor module 302 determines whether the temperature observed by the second sensor 108.2 exceeds the threshold data value 308 for the temperature observed by the second sensor 108.2 over the period of time that exceeds the threshold period of time T, and sets the condition 318 and the bypass command 320 based on this determination.

If the temperature observed by the second sensor 108.2 is below (i.e., not greater than or less than or equal to) the threshold data value 308 for the temperature observed by the second sensor 108.2 and the third sensor 108.3 is employed, the temperature monitor module 302 compares the temperature observed by the third sensor 108.3 to the threshold data value 308 for the temperature observed by the third sensor 108.3. If the temperature observed by the third sensor 108.3 exceeds (i.e., is greater than) the threshold, the temperature monitor module 302 determines whether the temperature observed by the third sensor 108.3 exceeds the threshold data value 308 for the temperature observed by the third sensor 108.3 for a period of time (based on the time data 305) that exceeds (i.e., is greater than) the threshold period of time T. If the temperature observed by the third sensor 108.3 remains above the threshold data value 308 for the temperature observed by the third sensor 108.3 for the period of time that exceeds the threshold period of time T, the temperature monitor module 302 sets the condition 318 for the UI control module 306 and sets the bypass command 320 for the valve control module 304. Thus, the temperature monitor module 302 determines whether the temperature observed by the third sensor 108.3 exceeds the threshold data value 308 for the temperature observed by the third sensor 108.3 over the period of time that exceeds the threshold period of time T, and sets the condition 318 and the bypass command 320 based on this determination.

Once the temperature monitor module 302 has set the bypass command 320 for the valve control module 304 and/or the condition 318 for the UI control module 306, the temperature monitor module 302 sends a reset signal to the timer module 303 to reset the time data 305 to zero. The temperature monitor module 302 receives and processes the sensor data 310 to determine the temperature observed by each of the first sensor 108.1, the second sensor 108.2 and the third sensor 108.3. The temperature monitor module 302 determines whether one or more of the temperatures observed by each of the first sensor 108.1, the second sensor 108.2 and the third sensor 108.3 is below (i.e., not greater than or less than or equal to) the respective threshold data values 308 for the temperature observed by each of the first sensor 108.1, the second sensor 108.2 and the third sensor 108.3. If one or more of the temperatures observed by each of the first sensor 108.1, the second sensor 108.2 and the third sensor 108.3 is below than the respective threshold data values 308 for the temperature observed by each of the first sensor 108.1, the second sensor 108.2 and the third sensor 108.3, the temperature monitor module 302 determines whether the observed temperatures remain below the respective threshold data values 308 over the period of time (based on the time data 305) that is above or exceeds (i.e., is greater than) the threshold period of time T. If true, the temperature monitor module 302 sets enable 324 for the valve control module 304. The enable 324 is a command for the valve control module 304 to change the valve 104 to the first state to enable exhaust gas to flow through the DPF 164'.

The timer module 303 provides the time data 305 to the temperature monitor module 302. Thus, the timer module 303 acts as a timer or counter for the temperature monitor module 302. The timer module 303 is responsive to an input from the temperature monitor module 302 to reset, such that the time data 305 is set back to zero.

The valve control module 304 receives as input the bypass command 320 and valve position data 321. The valve position data 321 is the sensor signals received from the position sensor 105. The valve control module 304 processes the sensor signals received as the valve position data 321 and determines a current state of the valve 104 (i.e. the first state or the second state) as observed by the position sensor 105.

Based on the determination that the valve 104 is in the first state and the receipt of the bypass command 320, the valve control module 304 outputs first control signals 326. The first control signals 326 are one or more control signals that command the valve 104 to change from the first state in which the exhaust gas flows through the DPF 164' to the second state in which substantially all exhaust gas flows through the bypass duct 106. If the valve 104 is determined by the valve control module 304 to be in the second state (based on the valve position data 321) and the bypass command 320 is received, the valve control module 304 may set an error flag to the UI control module 306 for rendering the one or more notifications 322, or the valve control module 304 may take no action.

The valve control module 304 also receives as input the enable 324. Based on the enable 324, the valve control module 304 processes the sensor signals received as the valve position data 321 determines a current state of the valve 104 (i.e. the first state or the second state) as observed by the position sensor 105. Based on the determined state of the valve 104 as the second state and the receipt of the enable 324, the valve control module 304 outputs second control signals 328. The second control signals 328 are one or more control signals that command the valve 104 to change from the second state to the first state in which the exhaust gas flows through the DPF 164'. If the valve 104 is determined by the valve control module 304 to be in the first state (based on the valve position data 321) and the enable 324 is received, the valve control module 304 may set an error flag to the UI control module 306 for rendering the one or more notifications 322, or the valve control module 304 may take no action.

It should be noted that in various embodiments, the valve control module 304 may store the current position of the valve 104 (as commanded by the first control signals 326 or second control signals 328) as a Boolean variable in a datastore or memory associated with the valve control module 304, including, but not limited to, the media 46. In this example, the current state of the valve 104 may be directly modified by valve control module 304 based on the previous valve command (i.e., command output by the first control signals 326 or second control signals 328), such that the current state of the valve 104 is known to the valve control module 304 and stored in memory. In other words, the present disclosure is not limited to the use of the position sensor 105 to determine the state of the valve 104, rather, the use of the position sensor 105 is merely an example.

The UI control module 306 receives as input the condition 318. Based on the condition 318, the UI control module 306 outputs the one or more notifications 322 for the occupant of the vehicle 10. In one example, the notifications 322 include one or more light control signals 330 and user interface data 332. The one or more light control signals 330 command the indicator light 210 to illuminate to visually notify the occupant of the condition of the vehicle 10. In one example, the indicator light 210 illuminates a symbol and/or a textual message, including, but not limited to, a symbol of an engine, text that reads "Check Engine," "Service Engine," etc.

Based on the receipt of the condition 318, the UI control module 306 generates warning user interface data 332 for rendering a warning user interface on the display 208 of the human-machine interface 110. In one example, the warning user interface data 332 includes a graphical and/or textual message, which indicates that the vehicle 10 needs service. For example, the warning user interface data 332 includes a symbol of an engine, a message that reads "Check Engine," "Service Engine," etc.

Figure 8:
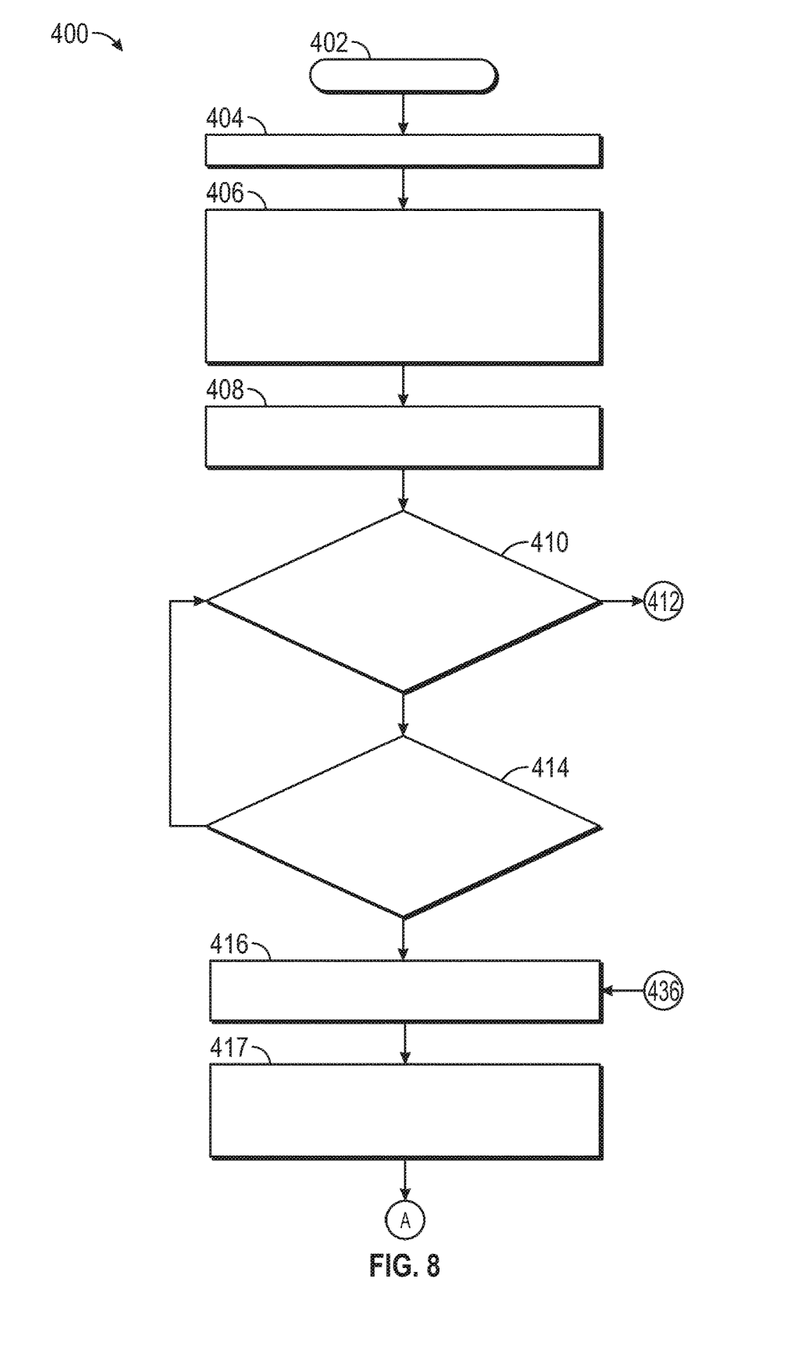
FIG. 8 is a flowchart illustrating a control method that may be performed by the after treatment bypass system of the vehicle of FIG. 1, in accordance with various embodiments.

Referring now to FIG. 8, and with continued reference to FIGS. 1-7, a flowchart illustrates a control method 400 that can be performed by the after treatment bypass system 100 of FIGS. 1-7 to control the valve 104 and to output one or more notifications to the occupant of the vehicle 10 in accordance with the present disclosure. In various embodiments, the control method 400 is performed by the processor 44 of the controller 40. As can be appreciated in light of the disclosure, the order of operation within the method is not limited to the sequential execution as illustrated in FIG. 8, but may be performed in one or more varying orders as applicable and in accordance with the present disclosure. In various embodiments, the control method 400 can be scheduled to run based on one or more predetermined events, and/or can run continuously during operation of the vehicle 10.

The method begins at 402. At 404, the method starts the timer module 303. At 406, the method receives and processes the sensor data 310 received from the sensors 108 (i.e., the first sensor data 312, the second sensor data 314 and the third sensor data 316) to determine the temperature of the exhaust gas stream observed by each of the sensors 108. At 408, the method retrieves the threshold data values 308 from the threshold datastore 300. At 410, the method compares the temperature observed by the first sensor 108.1 to the first pre-defined threshold for the temperature observed by the first sensor 108.1. If the temperature observed by the first sensor 108.1 is below the first pre-defined threshold for the temperature observed by the first sensor 108.1, the method proceeds to 412 on FIG. 10.

Otherwise, if the temperature observed by the first sensor 108.1 exceeds first pre-defined threshold for the temperature observed by the first sensor 108.1, the method proceeds to 414. At 414, the method determines whether the temperature observed by the first sensor 108.1 exceeds the first pre-defined threshold for the temperature for a period of time (based on the time data 305) that exceeds the period of time threshold T. If true, the method proceeds to 416. Otherwise, the method loops to 410.

At 416, the method generates and outputs the one or more notifications 322. In one example, the method generates and outputs the one or more light control signals 330 to illuminate the indicator light 210 and/or the method generates and outputs the warning user interface data 332 to render the warning user interface on the display 208 to notify the occupant that the vehicle 10 requires service. At 417, the method receives and processes the valve position data 321 received from the position sensor 105 to determine a current state of the valve 104 (i.e. the first state or the second state). Continuing from A on FIG. 8 to A on FIG. 9, from A, at 418, based on the determination that the valve 104 is in the first state in which exhaust gas flows through the DPF 164', the method generates and outputs the first control signals 326 to move the valve 104 to the second state to direct substantially all of the exhaust gas through the bypass duct 106.

Figure 9:
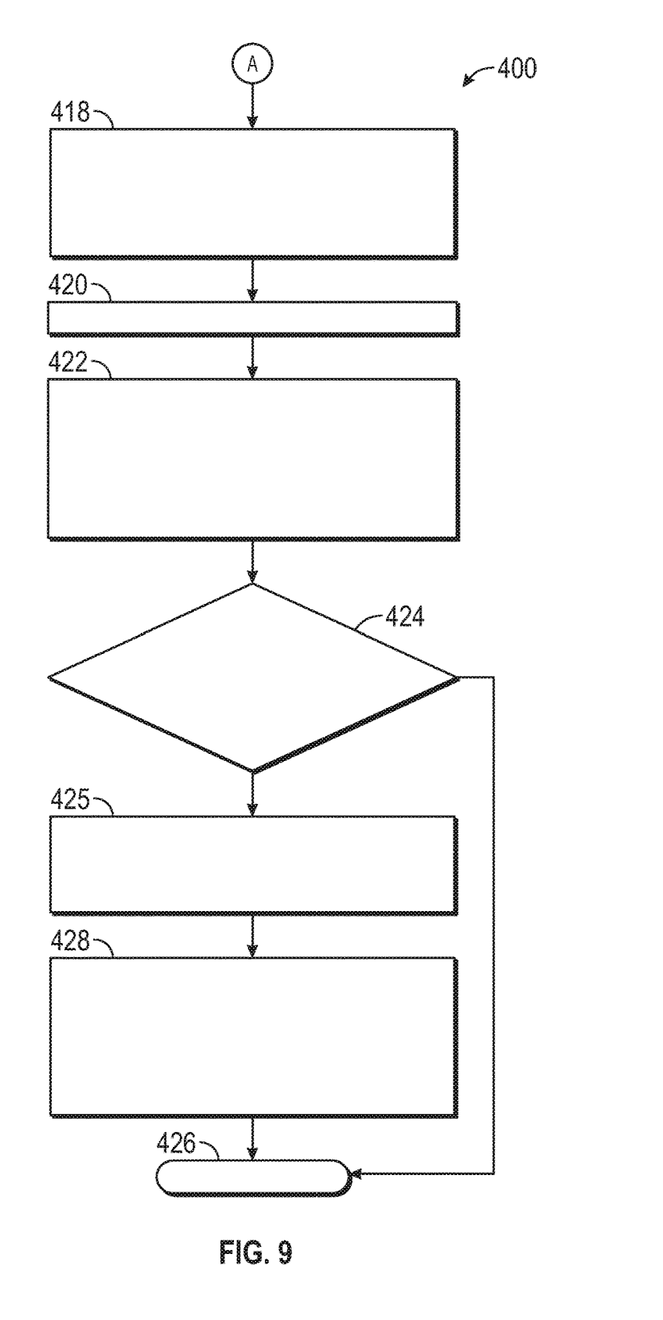
FIG. 9 is a continuation of the flowchart of FIG. 8, in accordance with various embodiments.

At 420, the method sends the signal to the timer module 303 to reset the time data 305 equal to zero and starts the timer module 303. At 422, the method receives and processes the sensor data 310 received from the sensors 108 (i.e., the first sensor data 312, the second sensor data 314 and the third sensor data 316) to determine the temperature observed by each of the sensors 108. At 424, the method determines whether one or more of the temperatures observed by each of the sensors 108 is below the respective threshold for temperatures observed by the respective sensors 108 from the threshold data values 308 for a period of time (based on the time data 305) that exceeds (i.e., is greater than) the period of time threshold T. If false, the method ends at 426. Otherwise, if true, at 425, the method receives and processes the valve position data 321 received from the position sensor 105 to determine a current state of the valve 104 (i.e. the first state or the second state). At 428, based on the determination that the valve 104 is in the second state such that substantially all of the exhaust gas flows through the bypass duct 106, the method generates and outputs the second control signals 328 to move the valve 104 to the first state to enable exhaust gas to flow through the DPF 164'. The method ends at 426.

Figure 10:
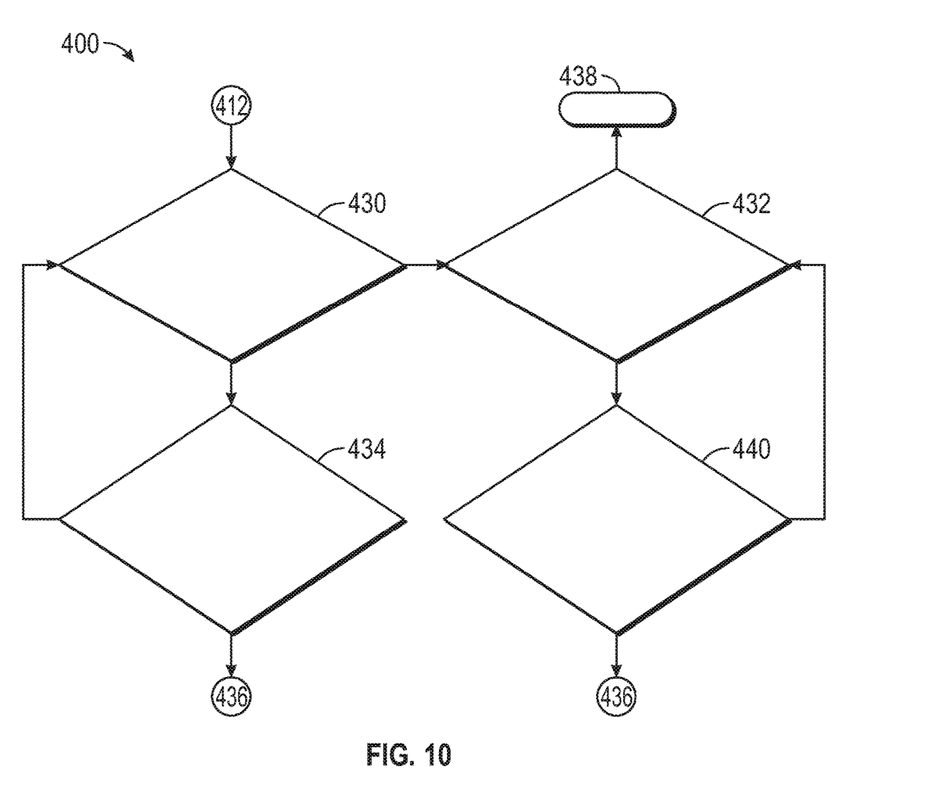
FIG. 10 is a continuation of the flowchart of FIG. 8, in accordance with various embodiments.

Continuing from 412 shown in FIGS. 8 and 10 at 430, the method compares the temperature observed by the second sensor 108.2 to the second pre-defined threshold for the temperature observed by the second sensor 108.2. If the temperature observed by the second sensor 108.2 is below the second pre-defined threshold for the temperature observed by the second sensor 108.2, the method proceeds to 432.

Otherwise, if the temperature observed by the second sensor 108.2 exceeds (i.e., is greater than) the second pre-defined threshold for the temperature observed by the second sensor 108.2, the method proceeds to 434. At 434, the method determines whether the temperature observed by the second sensor 108.2 exceeds the second pre-defined threshold for a period of time (based on the time data 305) that exceeds (i.e., is greater than) the period of time threshold T. If true, the method proceeds to 436 on FIG. 8. Otherwise, the method loops to 430.

If the temperature observed by the second sensor 108.2 is below (i.e., not greater than or less than or equal to) the second pre-defined threshold for the temperature observed by the second sensor 108.2, at 432, the method compares the temperature observed by the third sensor 108.3 to the third pre-defined threshold for the temperature observed by the third sensor 108.3. If the temperature observed by the third sensor 108.3 is below the third pre-defined threshold for the temperature observed by the third sensor 108.3, the method ends at 438.

Otherwise, if the temperature observed by the third sensor 108.3 exceeds (i.e., is greater than) the third pre-defined threshold for the temperature observed by the third sensor 108.3, the method proceeds to 440. At 440, the method determines whether the temperature observed by the third sensor 108.3 exceeds the third pre-defined threshold for a period of time (based on the time data 305) that exceeds (i.e., is greater than) the period of time threshold T. If true, the method proceeds to 436 on FIG. 8. Otherwise, the method loops to 432.

Thus, the after treatment bypass system 100 enables the after treatment device 164, such as the DPF 164', to be bypassed when one or more of a temperature observed upstream or downstream of the after treatment device 164 exceeds (i.e., is greater than) the predefined threshold. This reduces the likelihood of a thermal event in the after treatment device 164, such as the DPF 164', due to a high concentration of diesel particulate matter and/or hydrocarbons, which further protects the after treatment device 164, such as the DPF 164', and the surrounding components of the vehicle 10 from damage. The after treatment bypass system 100 also enables regeneration of the DPF 164' with higher soot levels (both in general and at service), because the control system 199 of the after treatment bypass system 100 may allow for different safety margins during soot loading level calibration as the control method performed by the controller 40 reduces the likelihood of a thermal event.

While at least one exemplary embodiment has been presented in the foregoing detailed description, it should be appreciated that a vast number of variations exist. It should also be appreciated that the exemplary embodiment or exemplary embodiments are only examples, and are not intended to limit the scope, applicability, or configuration of the disclosure in any way. Rather, the foregoing detailed description will provide those skilled in the art with a convenient road map for implementing the exemplary embodiment or exemplary embodiments. It should be understood that various changes can be made in the function and arrangement of elements without departing from the scope of the disclosure as set forth in the appended claims and the legal equivalents thereof.

What is claimed is:

1. A method for controlling a valve for directing an exhaust gas stream through an exhaust duct having an after treatment device and a bypass duct in an exhaust system of a vehicle, the method comprising:
   receiving, by a processor, first sensor signals from a first sensor coupled downstream from the exhaust after treatment device;
   processing, by the processor, the first sensor signals to determine a first temperature of an outlet exhaust gas stream;
   receiving, by the processor, second sensor signals from a second sensor coupled to the after treatment device;
   processing, by the processor, the second sensor signals to determine a second temperature of a through-flow exhaust gas stream;
   determining, by the processor, a bypass command based on whether the first temperature exceeds a first pre-defined threshold for the outlet exhaust gas stream and whether the second temperature exceeds a second pre-defined threshold for the through-flow exhaust gas stream; and
   outputting, by the processor, a control signal based on the determining of the bypass command to a valve coupled to the bypass duct and the exhaust pipe upstream of the after treatment device to move the valve between a first state to establish fluid communication through the after treatment device and a second state to establish fluid communication through the bypass duct and around the after treatment device.

2. The method of claim 1, further comprising:
   determining, by the processor, the bypass command based on the second temperature exceeding the second pre-defined threshold and the valve being in the first state; and
   outputting, by the processor, the control signal to move the valve to the second state based on the bypass command.

3. The method of claim 2, further comprising:
   receiving, by the processor, third sensor signals from a third sensor coupled upstream from the exhaust after treatment device;
   processing, by the processor, the third sensor signals to determine a third temperature of an inlet exhaust gas stream;
   determining, by the processor, the bypass command based on whether the third temperature exceeds a third pre-defined threshold for the inlet exhaust gas stream; and
   outputting, by the processor, the control signal to move the valve to the second state based on the bypass command.

4. The method of claim 3, further comprising:
   determining, by the processor, the bypass command based on the third temperature exceeding the third pre-defined threshold and the valve being in the first state; and
   outputting, by the processor, the bypass command to move the valve to the second state based on the bypass command.

5. The method of claim 1, wherein the outputting the control signal to the valve coupled to the bypass duct further comprises:
   determining, by the processor, the bypass command based on the first temperature exceeding the first pre-defined threshold and the valve being in the first state; and
   outputting, by the processor, the control signal to move the valve to the second state.

6. The method of claim 5, further comprising generating, by the processor, an occupant notification when the first temperature exceeds the first pre-defined threshold.

7. The method of claim 5, wherein the outputting the control signal to the valve coupled to the bypass duct further comprises:
   determining, by the processor, the bypass command based on the first temperature exceeding the first pre-defined threshold for a period of time that exceeds a time period threshold and the valve being in the first state; and
   outputting, by the processor, the control signal to the valve to move to the second based on the bypass command.

8. The method of claim 5, wherein subsequent to the outputting, by the processor, the control signal to the valve, the method further comprises:
   receiving, by the processor, the first sensor signals from the first sensor;
   processing, by the processor, the first sensor signals to determine a current temperature of the outlet exhaust gas stream;
   determining, by the processor, an enable based on the current temperature being below the first pre-defined threshold and the valve being in the second state; and
   outputting, by the processor, the control signal to move the valve to the first state based on the enable.

9. A control apparatus for an exhaust system having an after treatment device in an exhaust pipe of a vehicle, the control apparatus comprising:
   a first sensor located in the exhaust pipe downstream of the after treatment device and configured to observe a first temperature of an outlet exhaust gas stream and generate first sensor signals based on the first temperature;
   a second sensor located in the after treatment device and configured to observe a second temperature of a flow-through exhaust gas stream and generate second sensor signals based on the second temperature;
   a bypass duct coupled to the exhaust pipe upstream of the exhaust after treatment device and downstream from the exhaust after treatment device;
   a valve coupled to the bypass duct and the exhaust pipe upstream of the after treatment device and configured to move between a first state to establish fluid communication through the after treatment device and a second state to establish fluid communication through the bypass duct and around the after treatment device; and a controller, having a processor, configured to:
receive first sensor signals from the first sensor;
receive second sensor signals from the second sensor;
determine a first temperature of the outlet exhaust gas stream based on the first sensor signals;
determine the second temperature of the through-flow exhaust gas stream;
determine a bypass command based on whether the first temperature exceeds a first pre-defined threshold for the outlet exhaust gas stream and whether the second temperature exceeds a second pre-defined threshold for the through-flow exhaust gas stream; and
output a control signal based on the bypass command to move the valve between the first state and the second state.

10. The control apparatus of claim 9, wherein the controller is further configured to determine the bypass command based on the second temperature exceeding the second pre-defined threshold and the valve being in the first state, and to output the control signal to move the valve to the second state based on the bypass command.

11. The control apparatus of claim 9, further comprising:
a third sensor located in the exhaust pipe upstream from the after treatment device and configured to observe a third temperature of an inlet exhaust gas stream and to generate third sensor signals based on the third temperature,
wherein the controller is further configured to determine the bypass command based on whether the third temperature exceeds a third pre-defined threshold for the inlet exhaust gas stream and to output the control signal to move the valve to the second state based on the bypass command.

12. The control apparatus of claim 11, wherein the controller is further configured to determine the bypass command based on the third temperature exceeding the third pre-defined threshold and the valve being in the first state and output the bypass command to move the valve to the second state based on the bypass command.

13. The control apparatus of claim 9, wherein the controller is further configured to:
determine the bypass command based on the first temperature exceeding the first pre-defined threshold and the valve being in the first state; and
output the control signal to move the valve to the second state.

14. The control apparatus of claim 13, wherein the controller is further configured to generate an occupant notification when the first temperature exceeds the first pre-defined threshold.

15. A vehicle, comprising:
an exhaust system having an after treatment device in an exhaust pipe;
a bypass duct coupled to the exhaust pipe upstream of the after treatment device and downstream from the after treatment device;
a valve coupled to the bypass duct and the exhaust pipe upstream of the after treatment device and configured to move between a first state to establish fluid communication through the after treatment device and a second state to establish fluid communication through the bypass duct and around the after treatment device;
a first sensor located in the exhaust pipe downstream of the after treatment device and configured to observe a first temperature of an outlet exhaust gas stream and generate first sensor signals based on the first temperature;
a second sensor located in the after treatment device upstream of the first sensor and configured to observe a second temperature of a flow-through exhaust gas stream and generate second sensor signals based on the second temperature; and
a controller, having a processor, configured to:
receive first sensor signals from the first sensor and second sensor signals from the second sensor;
determine a first temperature of the outlet exhaust gas stream based on the first sensor signals and a second temperature of the flow-through exhaust gas stream based on the second sensor signals;
determine a bypass command based on whether the first temperature exceeds a first pre-defined threshold for the outlet exhaust gas stream or the second temperature exceeds a second pre-defined threshold for the flow-through exhaust gas stream; and
output a control signal based on the bypass command to move the valve between the first state and the second state.

16. The vehicle of claim 15, further comprising a notification device, wherein the controller is further configured to communicate an occupant notification to the notification device when the first temperature exceeds the first pre-defined threshold or the second temperature exceeds the second pre-defined threshold.

17. The vehicle of claim 16, wherein the notification device comprises at least an indicator light and a warning user interface rendered on a display associated with the vehicle.

18. The vehicle of claim 15, wherein the controller is further configured to determine whether the second temperature exceeds the second pre-defined threshold when the first temperature is below the first pre-defined threshold.

* * * * *